(12) United States Patent
Claessens et al.

(10) Patent No.: US 11,592,637 B2
(45) Date of Patent: Feb. 28, 2023

(54) CABLE ORGANIZER FOR FIBER OPTIC CABLES

(71) Applicant: COMMSCOPE CONNECTIVITY BELGIUM BVBA, Kessel-Lo (BE)

(72) Inventors: Bart Mattie Claessens, Hasselt (BE); Erwin Beckers, Werchter (BE)

(73) Assignee: COMMSCOPE CONNECTIVITY BELGIUM BVBA, Kessel-Lo (BE)

(*) Notice: Subject to any disclaimer, the term of this patent is extended or adjusted under 35 U.S.C. 154(b) by 0 days.

(21) Appl. No.: 17/259,125

(22) PCT Filed: Jul. 2, 2019

(86) PCT No.: PCT/EP2019/067785
§ 371 (c)(1),
(2) Date: Jan. 8, 2021

(87) PCT Pub. No.: WO2020/011608
PCT Pub. Date: Jan. 16, 2020

(65) Prior Publication Data
US 2021/0132316 A1    May 6, 2021

Related U.S. Application Data

(60) Provisional application No. 62/695,525, filed on Jul. 9, 2018.

(51) Int. Cl.
*G02B 6/44* (2006.01)

(52) U.S. Cl.
CPC .......... *G02B 6/4452* (2013.01); *G02B 6/4445* (2013.01); *G02B 6/4455* (2013.01); *G02B 6/4471* (2013.01)

(58) Field of Classification Search
CPC .......................... G02B 6/4455; G02B 6/4445
See application file for complete search history.

(56) References Cited

U.S. PATENT DOCUMENTS 6,304,707 B1 * 10/2001 Daems ................ G02B 6/4442
                                                  385/71
6,504,987 B1    1/2003 Macken et al.
(Continued)

FOREIGN PATENT DOCUMENTS

EP      0 692 102 B1    2/2002
EP      1 464 998 A2    10/2004
(Continued)

OTHER PUBLICATIONS

International Search Report and Written Opinion of the International Searching Authority for International Patent Application No. PCT/EP2019/067785 dated Oct. 9, 2019, 12 pages.

*Primary Examiner* — Sung H Pak
(74) *Attorney, Agent, or Firm* — Merchant & Gould P.C.

(57) ABSTRACT

A cable organizer for fiber optic cables includes a support structure, and a groove plate mounted to the support structure. The groove plate has an access groove for managing fiber optic cables on the groove plate. Fiber optic trays are pivotally mounted to the groove plate, and each fiber optic tray is configured to manage an optical fiber from the fiber optic cables. The access groove is at an angle relative to the fiber optic trays to provide a side access to the fiber optic cables.

19 Claims, 12 Drawing Sheets

(56) References Cited

U.S. PATENT DOCUMENTS

| | | | |
|---|---|---|---|
| 7,302,151 B2 * | 11/2007 | Lapp | .................... H02G 15/076 385/136 |
| 8,625,951 B2 | 1/2014 | Pimentel et al. | |
| 9,588,317 B2 | 3/2017 | Bryon et al. | |
| 9,709,766 B2 | 7/2017 | Claessens et al. | |
| 9,791,653 B2 | 10/2017 | Aznad et al. | |
| 9,857,547 B2 | 1/2018 | Claessens et al. | |
| 10,649,167 B2 | 5/2020 | Cornelissen et al. | |
| 11,187,865 B2 | 11/2021 | Kempeneers et al. | |
| 2006/0029351 A1 | 2/2006 | Lapp | |
| 2018/0039037 A1 | 2/2018 | Aznag et al. | |

FOREIGN PATENT DOCUMENTS

| | | |
|---|---|---|
| EP | 2 381 283 81 | 7/2013 |
| EP | 2 533 086 B1 | 8/2014 |
| EP | 2 290 418 B1 | 6/2015 |
| EP | 2 553 510 B1 | 9/2019 |
| ES | 2 551 595 B2 | 1/2018 |
| WO | 2012/110450 A1 | 8/2012 |
| WO | 2012/110454 A1 | 8/2012 |
| WO | 2014/122246 A2 | 8/2014 |

* cited by examiner

FIG. 12

CABLE ORGANIZER FOR FIBER OPTIC CABLES

CROSS-REFERENCE TO RELATED APPLICATION

This application is a National Stage Application of PCT/EP2019/067785, filed on 2 Jul. 2019, which claims the benefit of U.S. Patent Application Ser. No. 62/695,525, filed on Jul. 9, 2018, the disclosures of which are incorporated herein by reference in their entireties. To the extent appropriate, a claim of priority is made to each of the above disclosed applications.

TECHNICAL FIELD

The present disclosure relates to the management of optical fiber connections, and in particular, to a cable organizer that holds fiber optic trays.

BACKGROUND

Fiber optic cables are often managed by a cable organizer housed inside a telecommunications closure. The cable organizer typically includes a plurality of pivotally mounted trays mounted on a groove plate. The groove plate can manage a fiber optic cable so that an optical fiber from the cable can be guided to a tray. The tray can include various cable and fiber guides, guide walls, and retaining tabs for guiding incoming and outgoing cables and fibers to and from the telecommunications closure.

The spaces between the groove plate and the pivotally mounted trays are often tight and narrow which can make it difficult to guide the fiber optic cables onto the trays. Therefore, improvements in cable organizers are needed.

SUMMARY

The present disclosure relates generally to a cable organizer that can hold a plurality of fiber optic trays. In one possible configuration and by non-limiting example, the cable organizer includes a groove plate having at least one fiber access groove that manages one or more fiber optic cables on the groove plate, and that provides accessibility to the fiber optic cables from a side of the groove plate.

In one aspect, the disclosed technology relates to a cable organizer for fiber optic cables comprising: a support structure; a groove plate mounted to the support structure; a plurality of fiber optic trays pivotally mounted to a front surface of the groove plate; and a first access groove on the groove plate, the first access groove being angled relative to the front surface of the groove plate.

In some examples, the first access groove is angled at about 30 degrees to about 60 degrees relative to the front surface. In certain examples, the first access groove is angled at about 45 degrees relative to the front surface.

The cable organizer can further comprise a second access groove on the groove plate that is angled relative to the front surface of the groove plate. In some examples, the second access groove is angled at about 30 degrees to about 60 degrees relative to the front surface. In certain examples, the second access groove is angled at about 45 degrees relative to the front surface.

The cable organizer can further comprise arms attached to the front surface of the groove plate at one end and cantilevered with respect to the front surface of the groove plate at an opposite end, each arm having a tab on the cantilevered end that at least partially defines the shape of the first access groove. In some examples, each tab has a first shape or a second shape, the first shape being rectangular and the second shape being a pointed shape. In some examples, the access groove has at least one linear portion and at least one curved portion, the at least one linear portion being at least partially defined by a tab having the first shape, and the at least one curved portion being at least partially defined by a tab having the second shape.

The cable organizer can further comprise channels defined between the arms, the channels being configured to guide fiber optic cables from the first access groove to the plurality of fiber optic trays. In some examples, the channels are orthogonal to the first access groove and are parallel to the fiber optic trays. In some examples, the channels are connected to the linear portions of the first access groove.

In some examples, a closure for housing fiber optic equipment in a telecommunications network can include the cable organizer.

In another aspect, the disclosed technology relates to a cable organizer for fiber optic cables, the cable organizer comprising: a support structure; a first groove plate mounted to the support structure; a first plurality of fiber optic trays pivotally mounted to a front surface of the first groove plate; an access groove on the first groove plate, the access groove on the first groove plate being angled relative to the front surface of the first groove plate; a second groove plate mounted to the support structure; a second plurality of fiber optic trays pivotally mounted to a front surface of the second groove plate; and an access groove on the second groove plate, the access groove on the second groove plate being angled relative to the front surface of the second groove plate.

In some examples, the access groove on the first groove plate is angled at about 30 degrees to about 60 degrees relative to the front surface of the first groove plate. In some examples, the access groove on the second groove plate is angled at about 30 degrees to about 60 degrees relative to the front surface of the second groove plate.

The cable organizer can further comprise a second access groove on the first groove plate, the second access groove on the first groove plate being angled relative to the front surface of the first groove plate. The cable organizer can also comprise a second access groove on the second groove plate, the second access groove on the second groove plate being angled relative to the front surface of the first groove plate. In some examples, the second access groove on the first groove plate is angled at about 30 degrees to about 60 degrees relative to the front surface of the first groove plate. In some examples, the second access groove on the second groove plate is angled at about 30 degrees to about 60 degrees relative to the front surface of the second groove plate.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Any examples set forth in this specification are not intended to be limiting and merely set forth some of the many possible embodiments for the claimed invention.

Figure 1:
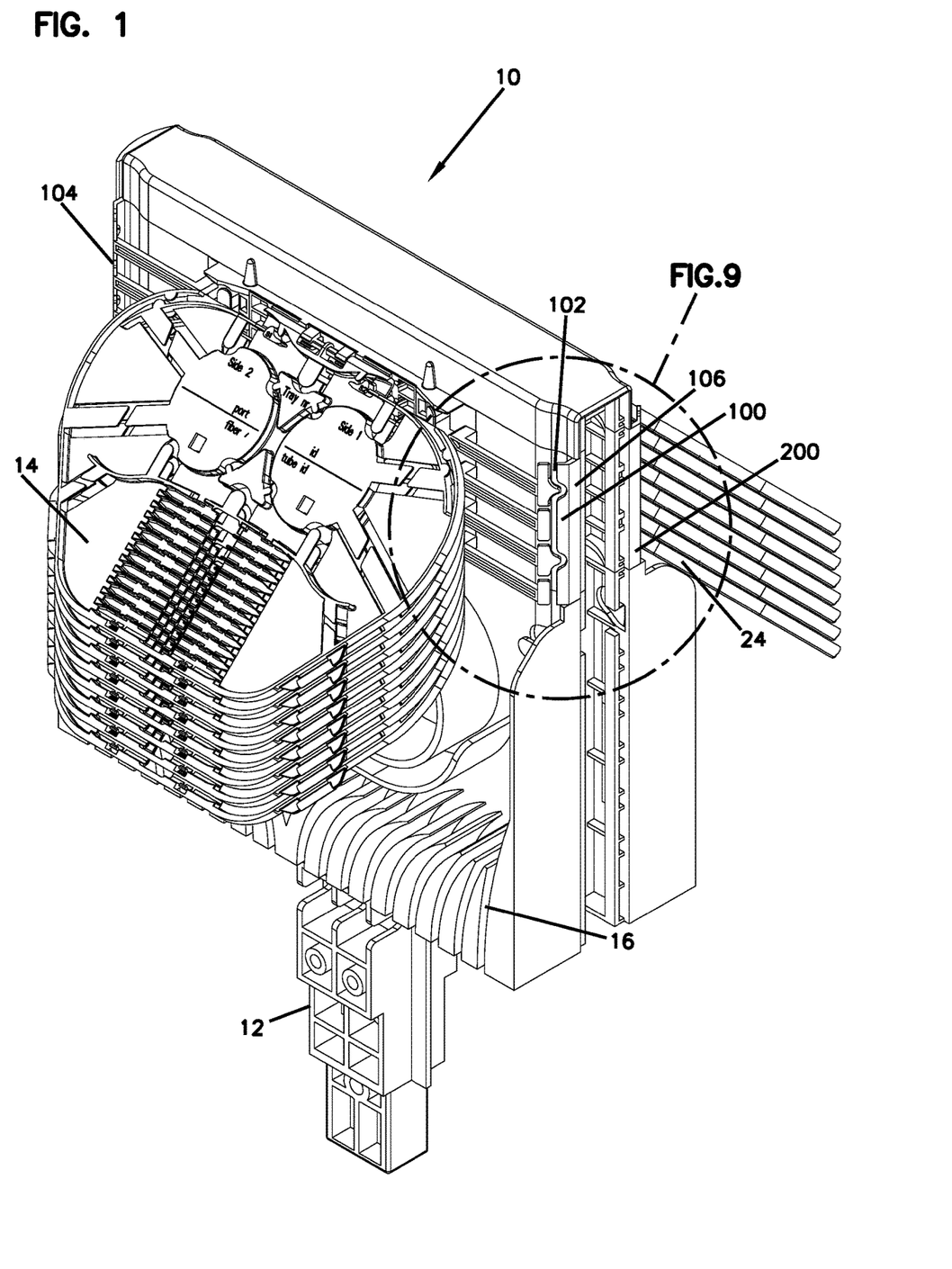
FIG. 1 is a front isometric view of a cable organizer.
Figure 2:
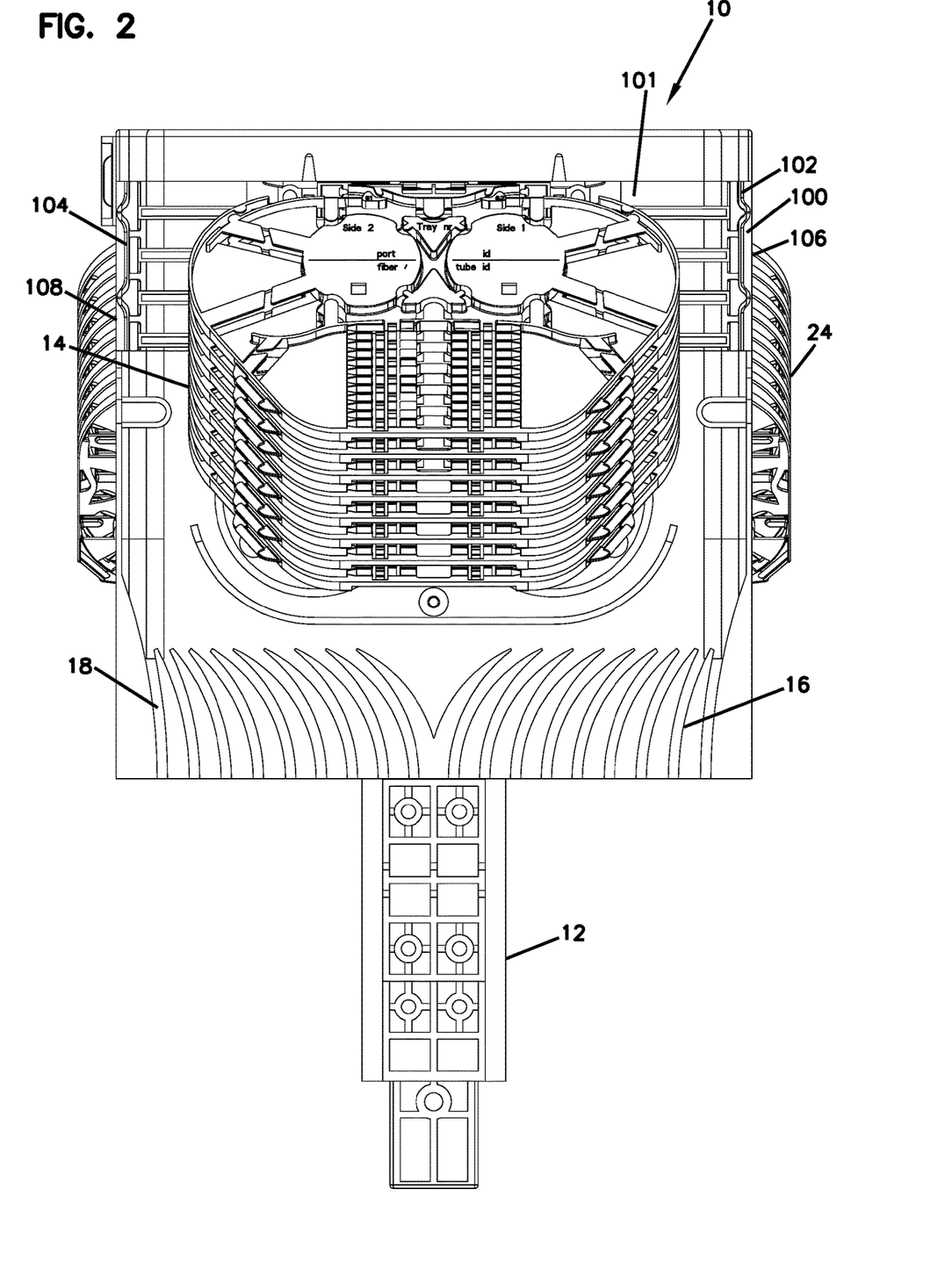
FIG. 2 is a front view of the cable organizer of FIG. 1.

FIG. 1 is a front isometric view of a cable organizer 10 for fiber optic cables. FIG. 2 is a front view of the cable organizer 10. The cable organizer 10 can be housed inside a telecommunications closure (not shown) that is used to house and/or store fiber optic equipment in a telecommunications network.

As shown in FIGS. 1 and 2, the cable organizer 10 includes a support structure 12, and a first groove plate 100 mounted to the support structure 12. The first groove plate 100 includes a first access groove 102 on a side 106 of the first groove plate 100, and a second access groove 104 on an opposite side 108 of the first groove plate 100. The first access groove 102 and the second access groove 104 can each be used manage and/or organize fiber optic cables (not shown) on the first groove plate 100 so that the fiber optic cables can enter a fiber optic tray at a selected height.

As shown in FIGS. 1 and 2, a first plurality of fiber optic trays 14 are pivotally mounted to the first groove plate 100. The first plurality of fiber optic trays 14 can be splice trays, splitter trays, wave division multiplexer trays, storage trays, or other trays. In the example illustrated in the figures, the first plurality of fiber optic trays 14 are splice trays. Each tray is configured to manage and/or hold one or more optical fibers from the fiber optic cables managed by the first groove plate 100.

As shown in FIGS. 1 and 2, a first set of curved pathways 16 and a second set of curved pathways 18 are mounted to the support structure 12. The first set of curved pathways 16 can be used to guide fiber optic cables from the support structure 12 to a channel inside the first groove plate 100 (i.e., behind the arms 50 shown in FIGS. 10 and 11, and described in more detail below) so that the first groove plate 100 can protect, organize, and/or manage the fiber optic cables using the first access groove 102. The second set of curved pathways 18 that can be used to guide fiber optic cables from the support structure 12 to another channel inside the first groove plate 100 (i.e., behind the arms 50 shown in FIGS. 10 and 12) so that the first groove plate 100 can protect, organize, and/or manage the fiber optic cables using the second access groove 104.

In alternative examples, it is contemplated that the cable organizer 10 can include only a single access groove on the first groove plate 100, such that the second access groove 104 is not included as part of the cable organizer 10.

Figure 3:
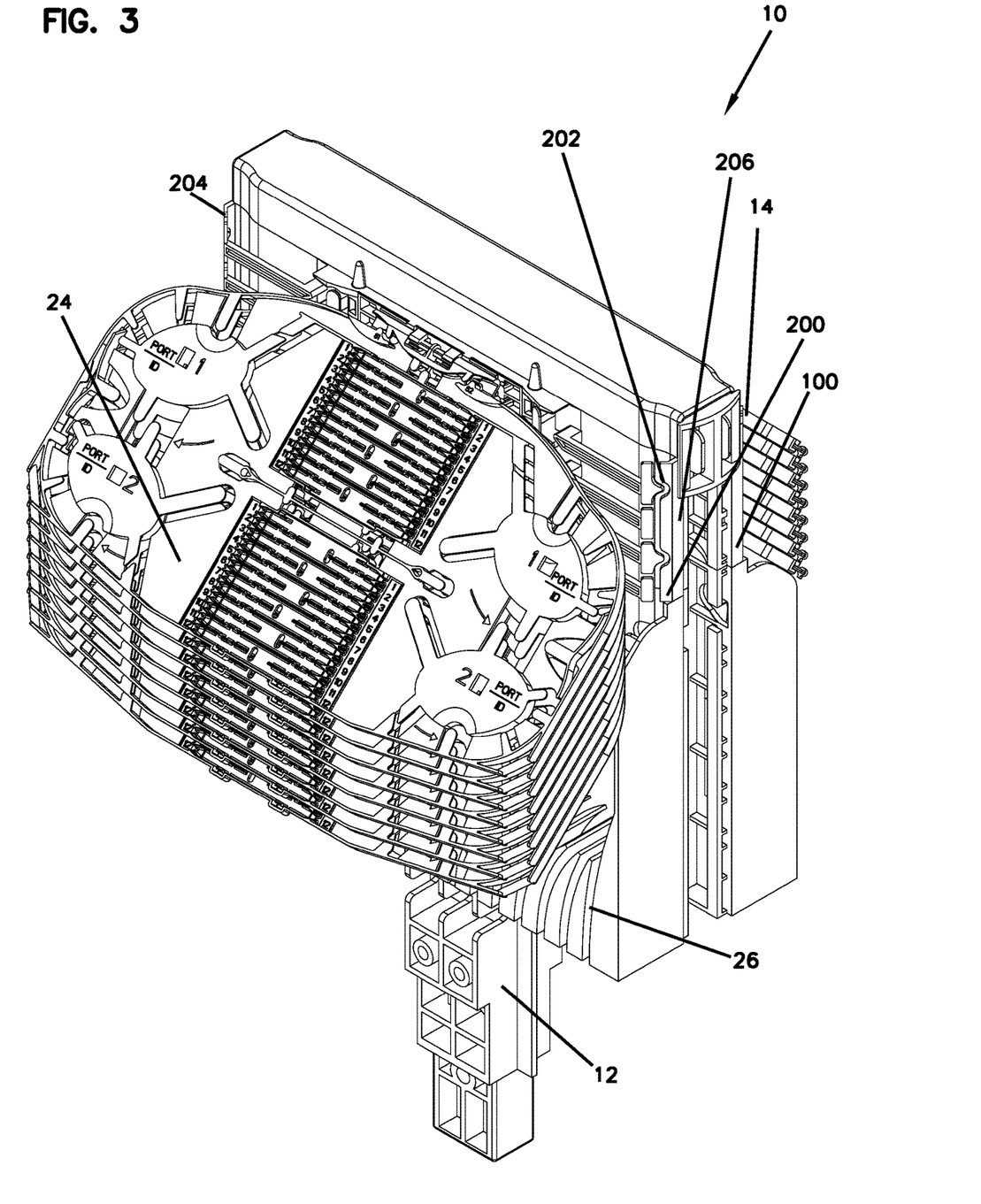
FIG. 3 is a rear isometric view of the cable organizer of FIG. 1.
Figure 4:
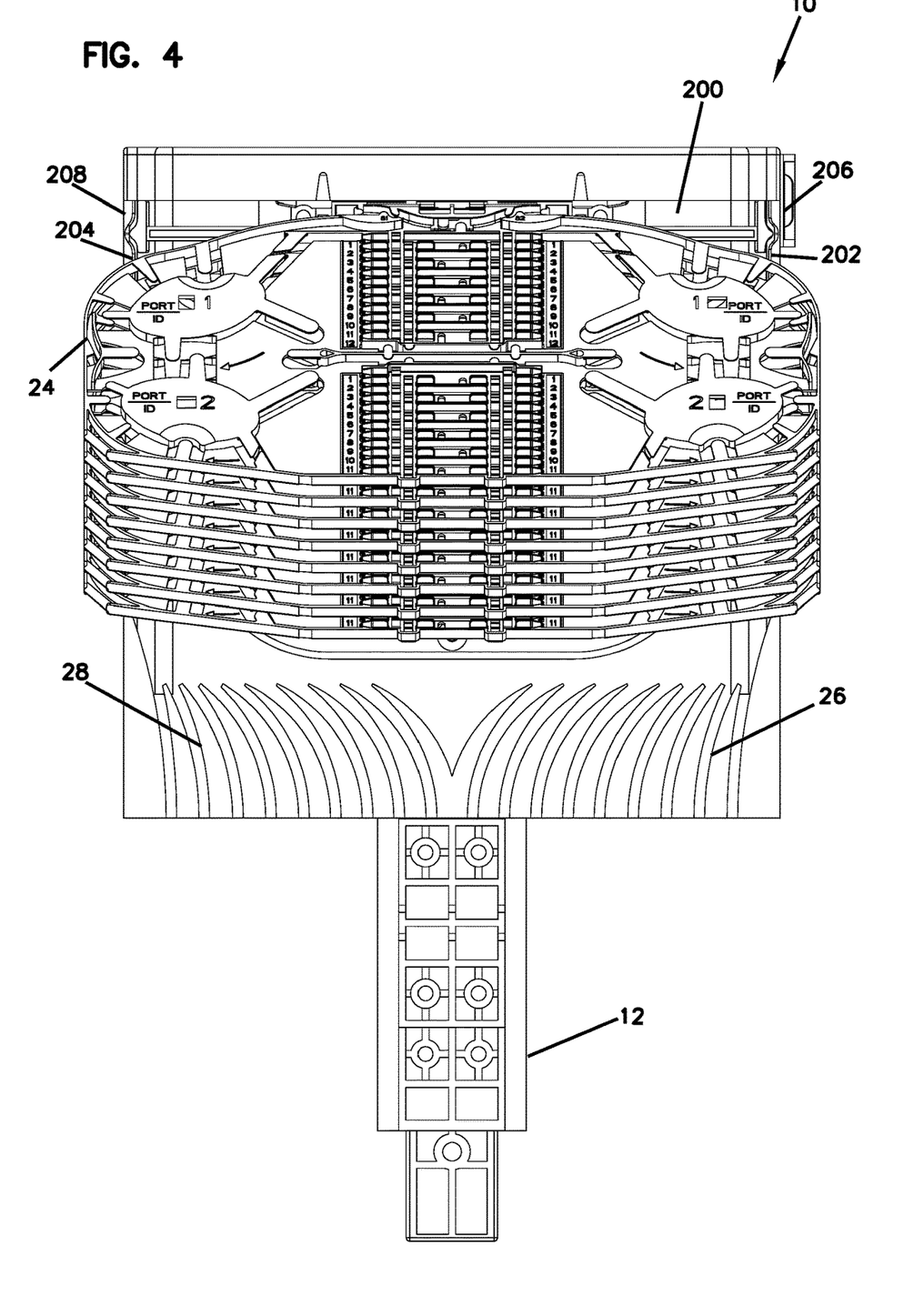
FIG. 4 is a rear view of the cable organizer of FIG. 1.

FIG. 3 is a rear isometric view of the cable organizer 10, and FIG. 4 is a rear view of the cable organizer 10. As shown in FIGS. 3 and 4, the cable organizer 10 can include a second groove plate 200 mounted to the support structure 12. The second groove plate 200 includes a first access groove 202 on a side 206 of the second groove plate 200, and a second access groove 204 on an opposite side 208 of the second groove plate 200. The first access groove 202 and the second access groove 204 can each be used to manage and/or organize fiber optic cables (not shown) to the second groove plate 200 so that the fiber optic cables can enter a fiber optic tray at a selected height.

As shown in FIGS. 3 and 4, a second plurality of fiber optic trays 24 are pivotally mounted to the second groove plate 200. The second plurality of fiber optic trays 24 can be splice trays, splitter trays, wave division multiplexer trays, storage trays, or other trays. In the example illustrated in the figures, the second plurality of fiber optic trays 24 are splice trays. Each tray from the second plurality of fiber optic trays 24 is configured to manage and/or hold one or more optical fibers from fiber optic cables managed by the second groove plate 200. The fiber optic trays from the second plurality of fiber optic trays 24 have more capacity and different fiber routings (and are hence larger) than the fiber optical trays from the first plurality of fiber optic trays 14.

Figure 10:
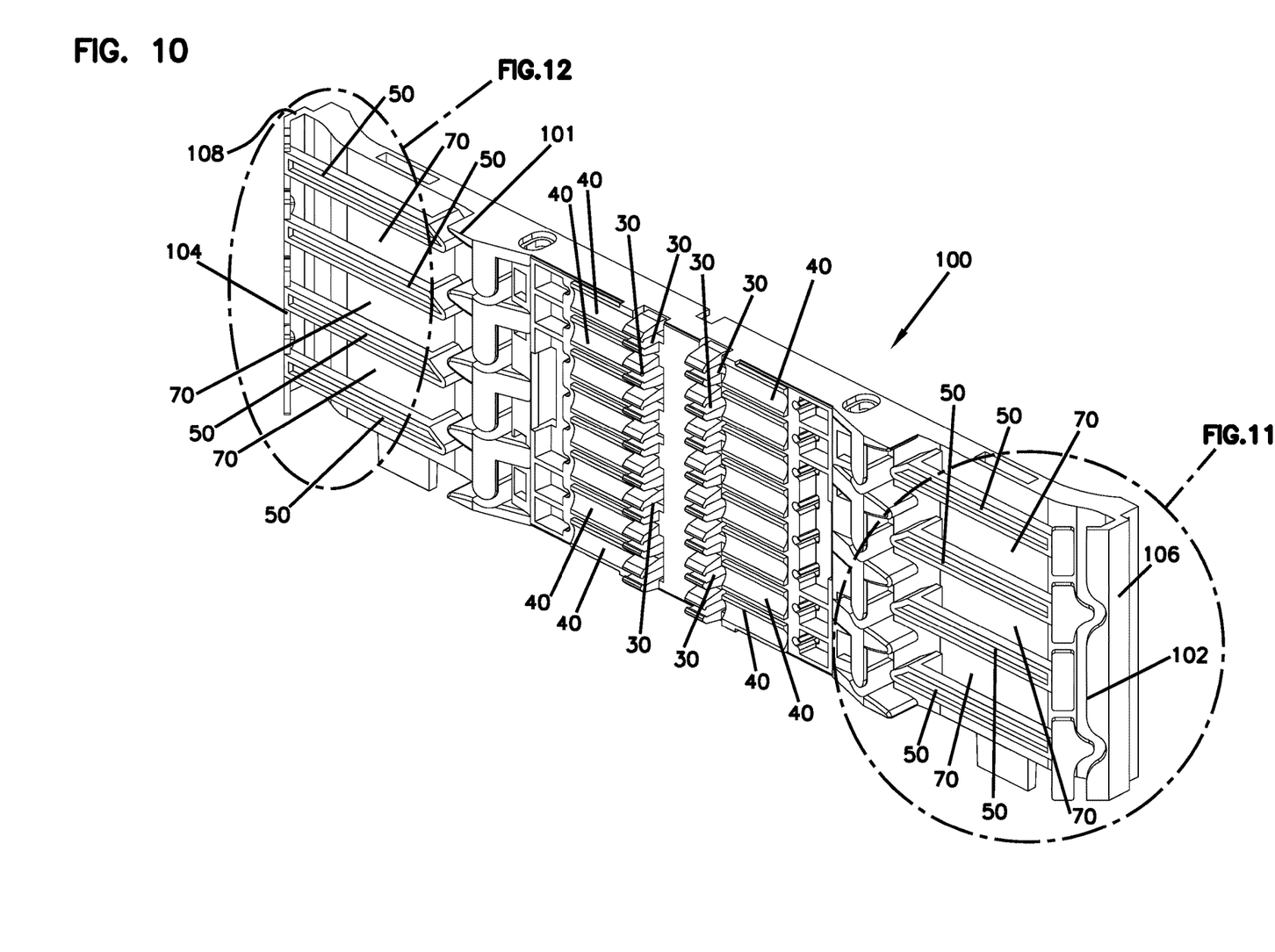
FIG. 10 is an isometric view of a groove plate.
Figure 11:
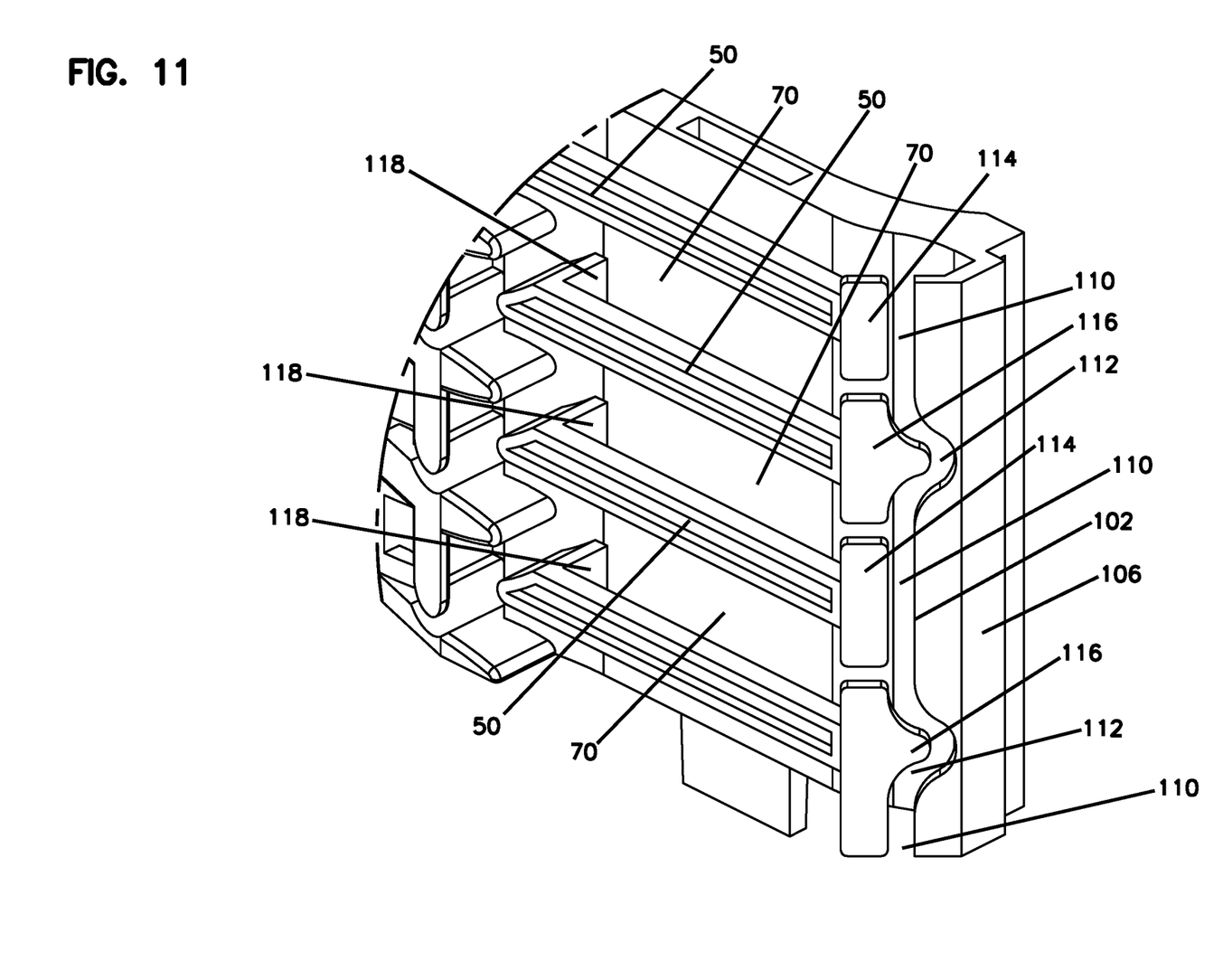
FIG. 11 is a detailed view of the groove plate of FIG. 10.
Figure 12:
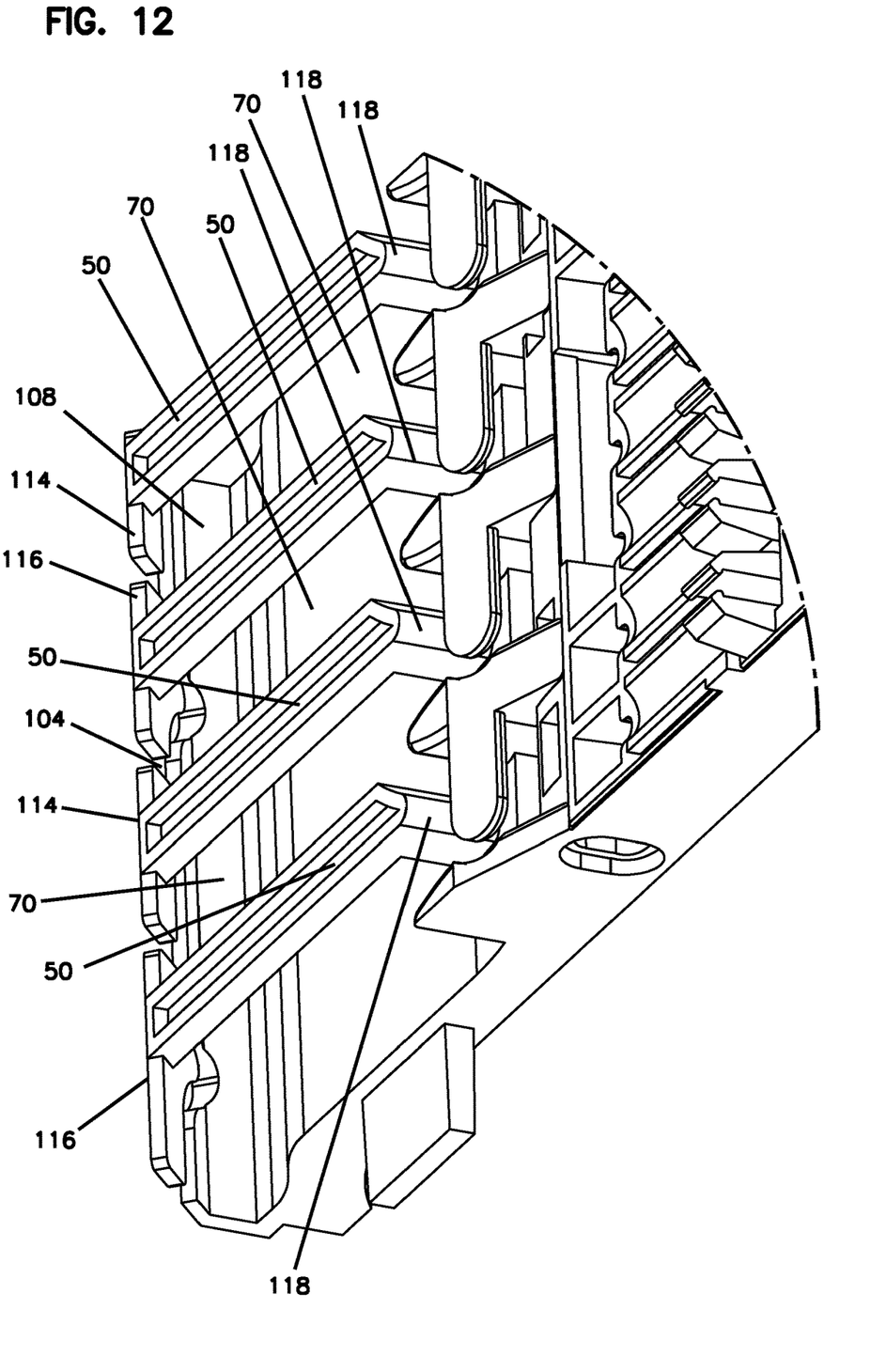
FIG. 12 is another detailed view of the groove plate of FIG. 10.

As shown in FIGS. 3 and 4, the side access provided by the first access groove 202 on the side 206 and the side access provided by the second access groove 204 on the side 208 of the second groove plate 200 is especially useful for the second plurality of fiber optic trays 24 which are larger than the first plurality of fiber optic trays 14 and cover a front access to the fiber optic cables managed by the groove plate (e.g., the channels 70 shown in FIGS. 10-12, and described in more detail below).

A third set of curved pathways 26 and a fourth set of curved pathways 28 are amounted to the support structure 12. The third set of curved pathways 26 can be used to guide the fiber optic cables from the support structure 12 to a channel (behind the arms 50 shown in FIGS. 10-12) inside the second groove plate 200 so that the groove plate can protect, organize, and/or manage the fiber optic cables using the first access groove 202. The fourth set of curved pathways 28 can be used to guide the fiber optic cables from the support structure 12 to another channel (behind the arms 50 shown in FIGS. 10-12) inside the second groove plate 200 so that the groove plate can protect, organize, and/or manage the fiber optic cables using the second access groove 204.

In alternative examples, it is contemplated that the cable organizer 10 can include only a single groove plate, such that the second groove plate 200 shown in FIGS. 3 and 4 is not included as part of the cable organizer 10.

Figure 5:
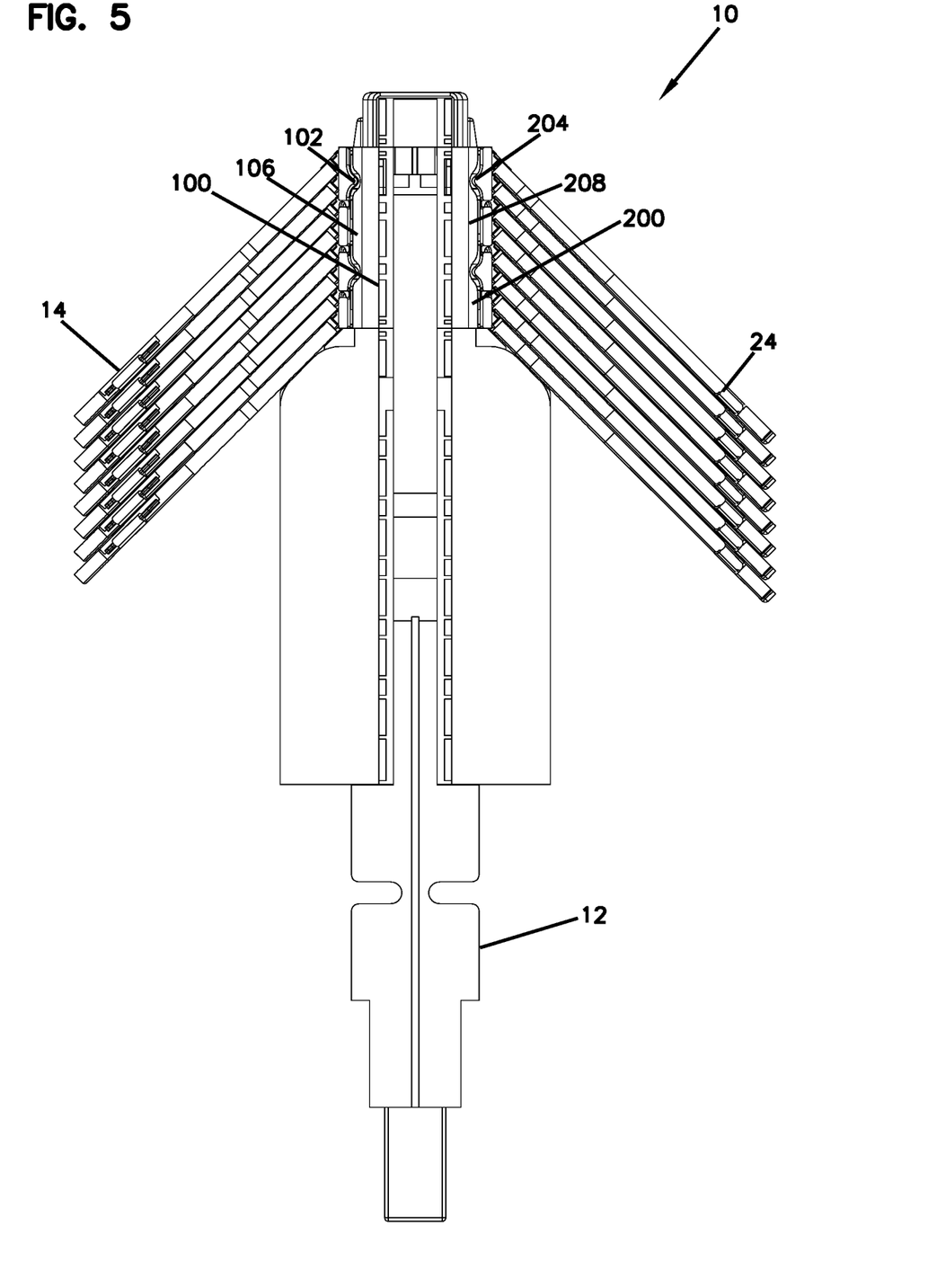
FIG. 5 is a right side view of the cable organizer of FIG. 1.
Figure 6:
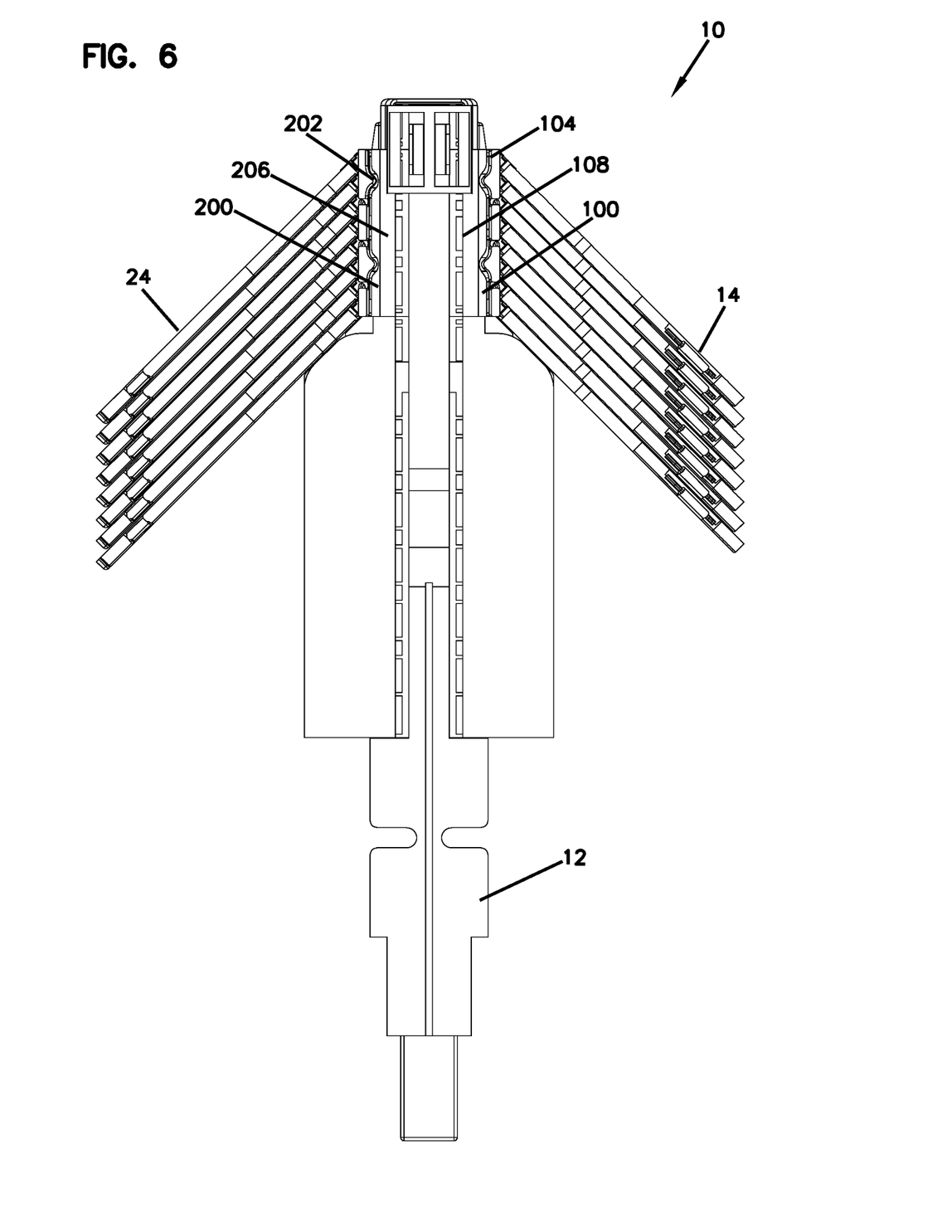
FIG. 6 is a left side view of the cable organizer of FIG. 1.

FIG. 5 is a right side view of the cable organizer 10, and FIG. 6 is a left side view of the cable organizer 10. As shown in FIGS. 5 and 6, the first plurality of fiber optic trays 14 and the second plurality of fiber optic trays 24 are each pivotally mounted in a stacked arrangement. Each tray in the first plurality of fiber optic trays 14 is pivotally movable relative to the first groove plate 100, and each tray in the second plurality of fiber optic trays 24 is pivotally movable relative to the second groove plate 200 so that each fiber optic tray can be accessed to help facilitate the addition or removal of a fiber (not shown), or the adjustment of a fiber on a fiber optic tray.

As shown in FIG. 5, the first access groove 102 of the first groove plate 100 is accessible from the side 106, and the second access groove 204 of the second groove plate 200 is accessible from the side 208. Accordingly, fiber optic cables (not shown) can be accessed from the side 106 of the first groove plate 100. Similarly, the fiber optic cables can be accessed from the side 208 of the second groove plate 200.

As shown in FIG. 6, the second access groove 104 of the first groove plate 100 is accessible from the side 108, and the first access groove 202 of the second groove plate 200 is accessible from the side 206. Accordingly, fiber optic cables can be accessed from the side 108 of the first groove plate 100. Similarly, the fiber optic cables can be accessed from the side 206 of the second groove plate 200.

Figure 7:
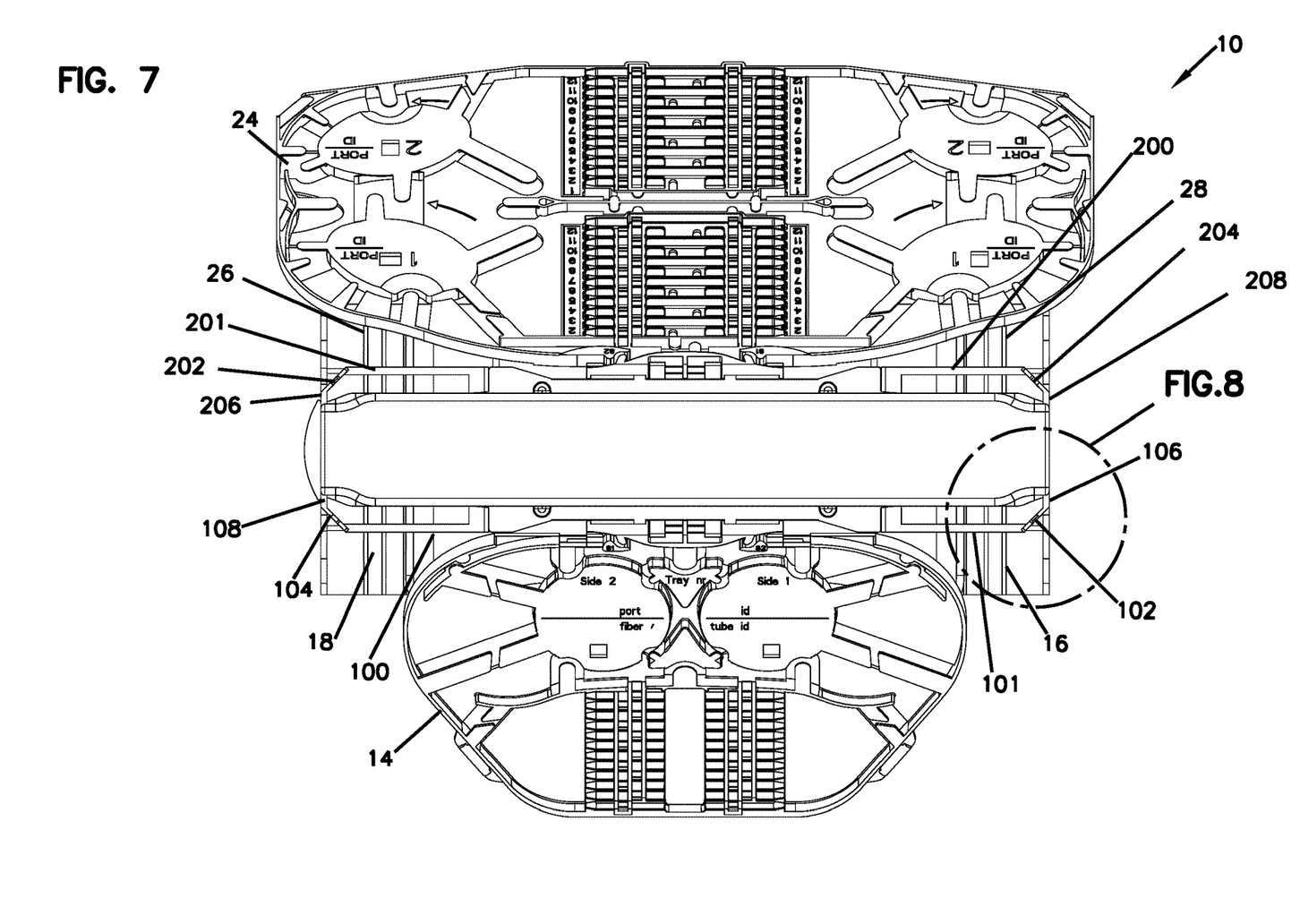
FIG. 7 is a top view of the cable organizer of FIG. 1.
Figure 8:
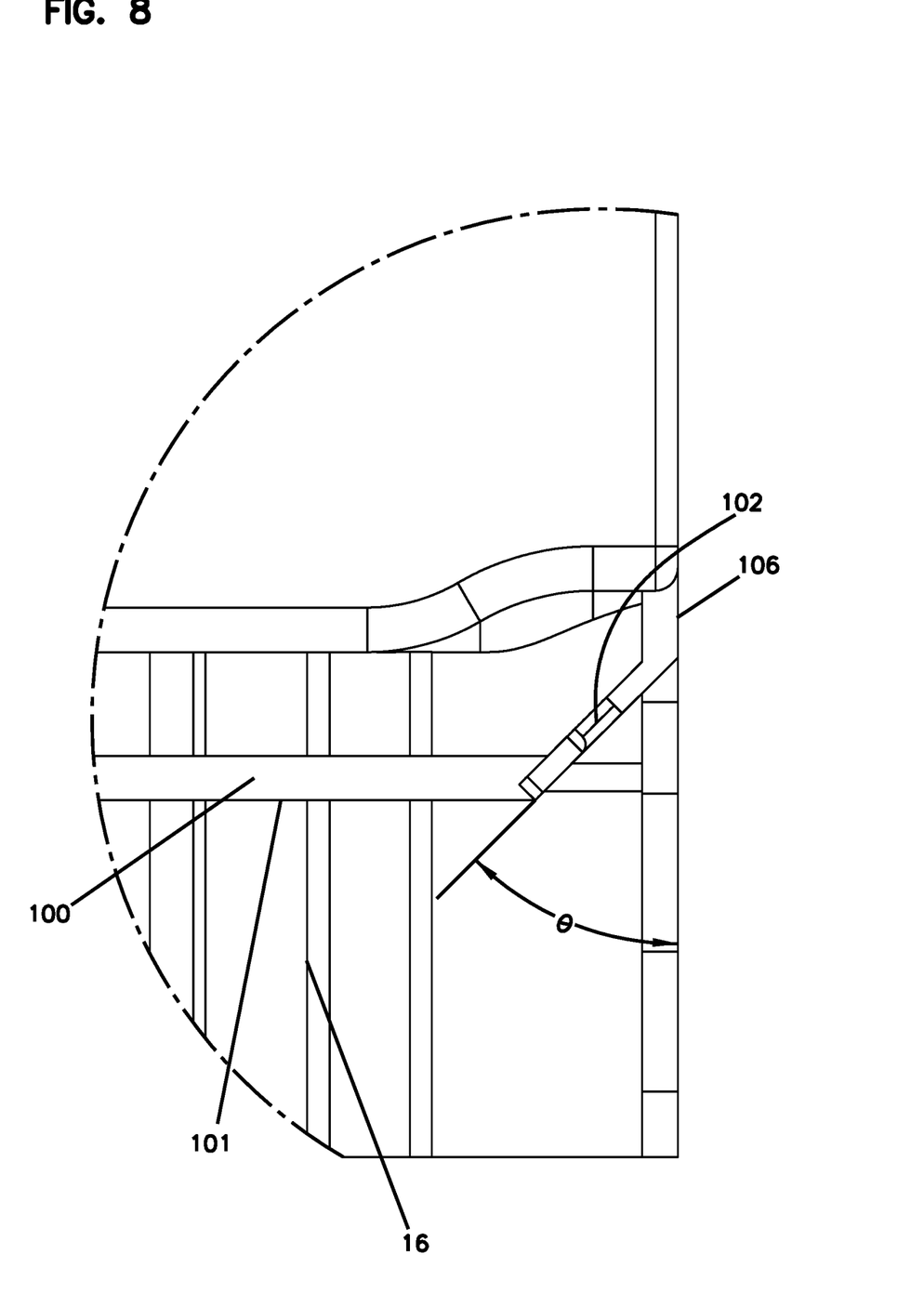
FIG. 8 is a detailed view of FIG. 7.

FIG. 7 is a top view of the cable organizer 10. FIG. 8 is a detailed view of the first groove plate 100 of FIG. 7. As shown in FIGS. 7 and 8, the first access groove 102 is orientated at an angle θ relative to a front surface 101 of the first groove plate 100.

Figure 9:
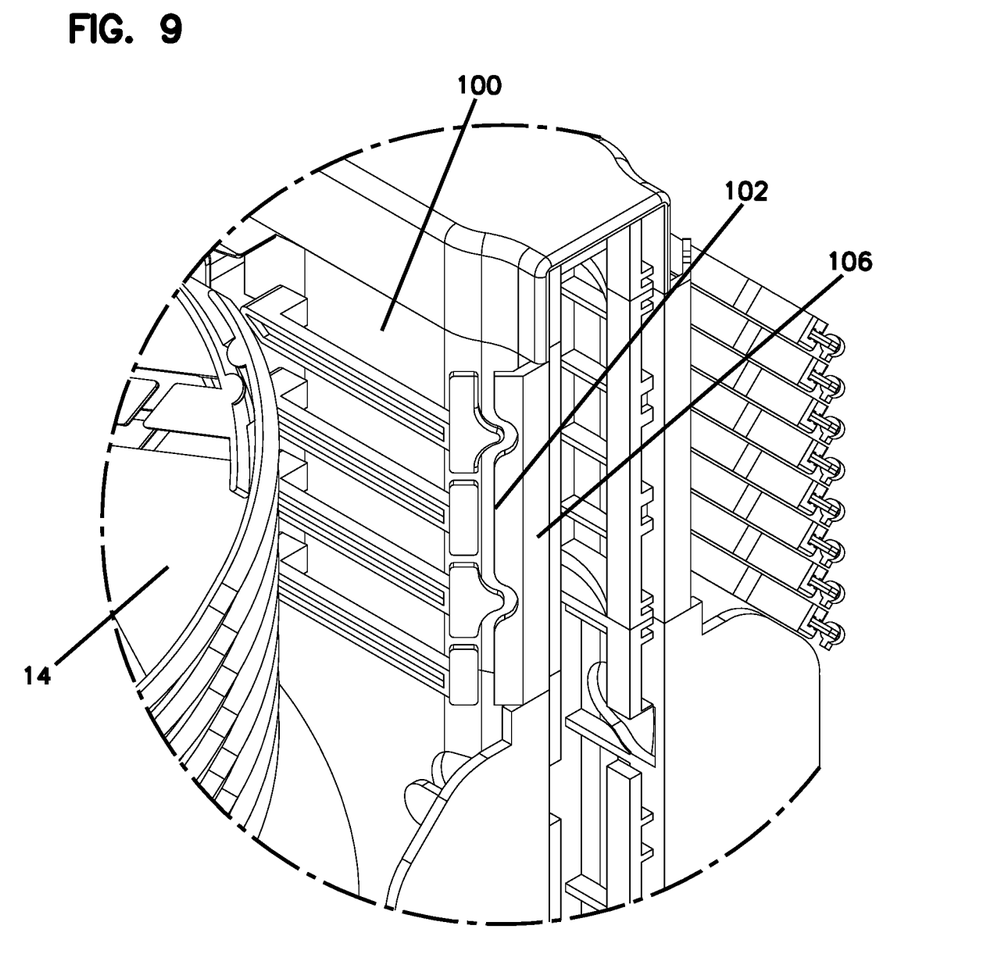
FIG. 9 is a detailed view of FIG. 1.

FIG. 9 is a detailed view of FIG. 1 that shows the first access groove 102 relative to the first plurality of fiber optic trays 14. As shown in FIGS. 7-9, the angle θ increases the clearance between first groove plate 100 and the first plurality of fiber optic trays 14, and can provide access to fiber optic cables (not shown) mounted to the first groove plate 100 from the side 106. The angle θ can help to ease the handling of fiber optic cables between the first groove plate 100 and the first plurality of fiber optic trays 14 for guiding the cables to the fiber optic trays.

Referring back to FIG. 7, the second access groove 104 of the first groove plate 100 is also positioned at an angle relative to the front surface 101 of the first groove plate 100 such that the second access grove 104 can provide access from the side 108 of the first groove plate 100 to fiber optic cables that run from the first groove plate 100 to the first plurality of fiber optic trays 14. The angle of the second access groove 104 relative to the first plurality of fiber optic trays 14 can help to ease the handling of fiber optic cables between the first groove plate 100 and the first plurality of fiber optic trays 14 for guiding the cables to the fiber optic trays.

In certain examples, the first and second access grooves 102, 104 of the first groove plate 100 are each positioned at about 30 degrees to about 60 degrees relative to the front surface 101 of the first groove plate 100. In certain examples, the first and second access grooves 102, 104 of the first groove plate 100 are each positioned at about 45 degrees relative to the front surface 101 of the first groove plate 100.

As shown in FIG. 7, the first access groove 202 of the second groove plate 200 is positioned at an angle relative to a front surface 201 of the second groove plate 200 and the second plurality of fiber optic trays 24. Accordingly, the first access grove 202 of the second groove plate 200 can provide access to fiber optic cables (not shown) from the side 206 of the second groove plate 200.

The second access groove 204 of the second groove plate 200 is also positioned at an angle relative to the front surface 201 and the second plurality of fiber optic trays 24 such that the second access grove 204 can provide access to fiber optic cables from the side 208 of the second groove plate 200. The angles of the first access groove 202 and the second access groove 204 relative to the second plurality of fiber optic trays 24 can help to ease the handling of fiber optic cables between the second groove plate 200 and the second plurality of fiber optic trays 24.

In some examples, the first and second access grooves 202, 204 of the second groove plate 200 are each positioned at about 30 degrees to about 60 degrees relative to the front surface 201 of the second groove plate 200. In certain examples, the first and second access grooves 202, 204 of the second groove plate 200 are each positioned at about 45 degrees relative to the front surface 201 of the second groove plate 200.

FIG. 10 is an isometric view of the first groove plate 100. The second groove plate 200 is substantially similar to the first groove plate 100, and thus the following description of the first groove plate 100 may also apply to the second groove plate 200.

As shown in FIG. 10, the front surface 101 of the first groove plate 100 includes a plurality of holders 30 and slots 40. Each tray from the first plurality of fiber optic trays 14 can snap fit into a holder 30. In some examples, each tray can snap fit into two adjacent holders 30. When mounted, each tray from the first plurality of fiber optic trays 14 can pivot within the slots 40 such that each tray can individually pivot with respect to the first groove plate 100 to allow selected access for a desired tray.

FIG. 11 is a detailed view of the first groove plate 100. As shown in FIG. 11, the front surface 101 of the first groove plate 100 includes a first set of arms 50 that each extend from an end 118 and terminate at a tab 114 having a first shape or a tab 116 having a second shape. Each arm 50 is connected to the first groove plate 100 at an end 118 and the first set of arms defines a channel for protecting, organizing, and/or managing the fiber optic cables inside the groove plate. The tabs 114 and the tabs 116 are cantilevered relative to the first groove plate 100.

As shown in FIG. 11, the first shape of the tabs 114 is substantially rectangular, and the second shape of the tabs 116 is a pointed shape. The tabs 114 and the tabs 116 are angled relative to the arms 50 and partially define the shape of the first access groove 102. A portion of the side 106 of the first groove plate 100 is also angled relative the arms 50, and at least partially defines the shape of the first access groove 102 as well. The arms 50 define channels 70 that can guide fiber optic cables from the first access groove 102 to a fiber optic tray.

FIG. 12 is another detailed view of the first groove plate 100. As shown in FIG. 12, the front surface 101 of the first groove plate 100 has a second set of arms 50 that each extend from an end 118 and terminate into a tab 114 having the first shape or a tab 116 having the second shape. The second set of arms 50 defines another a channel for protecting, organizing, and/or managing the fiber optic cables inside the first groove plate 100. As shown in FIG. 12, the tabs 114 and the tabs 116 are angled relative to the arms 50 and partially define the shape of the second access groove 104. As also shown in FIG. 12, a portion of the side 108 of the first groove plate 100 is also angled relative the arms 50, and at least partially defines the shape of the second access groove 104. The second set of arms 50 also define channels 70 that can guide fiber optic cables from the second access groove 104 to a fiber optic tray.

In some examples, the channels 70 are orthogonal to the first access groove 102 and the second access groove 104. In some examples, the channels 70 are parallel to the first plurality of fiber optic trays mounted to the first groove plate 100.

Referring back to FIG. 11, the first access groove 102 is shaped to include at least one linear portion 110 and at least one curved portion 112. The linear portions 110 are at least partially defined by the tabs 114, and the curved portions 112 are at least partially defined by the tabs 116. Each linear portion 110 is substantially parallel to the side 106 of the first groove plate 100. Each curved portion 112 initially bends away from the fiber optic trays and then bends toward the fiber optic trays. The first access groove 102 may include as many linear portions 110 and curved portions 112 as may be needed or desired for a particular application. The second access groove 104 on the first groove plate 100, and the first access groove 202 and the second access groove 204 on the second groove plate 200 can be similarly shaped as the first access groove 102.

As shown in FIGS. 10-12, the shape of the arms 50, channels 70, and the first access groove 102 and the second access groove 104 on the first groove plate 100 (as well as the first access groove 202 and the second access groove 204 on the second groove plate 200) can help to manage, organize, and/or guide fiber optic cables from the cable organizer 10 to the fiber optic trays, and to also improve accessibility to fiber optic cables that run from cable organizer 10 to the fiber optic trays by providing access to the fiber optic cables from the sides of the first and second groove plates.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A cable organizer for fiber optic cables, the cable organizer comprising:
   a support structure;
   a groove plate mounted to the support structure;
   a plurality of fiber optic trays pivotally mounted to a front surface of the groove plate;
   a first access groove on the groove plate, the first access groove being angled relative to the front surface of the groove plate and the first access groove providing access to the fiber optic cables from a side of the support structure; and
   arms attached to the front surface of the groove plate at a proximal end, each arm being cantilevered with respect to the front surface of the groove plate at a distal end, and each arm having a tab on the distal end that at least partially defines the shape of the first access groove.

2. The cable organizer of claim 1, wherein the first access groove is angled at about 30 degrees to about 60 degrees relative to the front surface.

3. The cable organizer of claim 1, wherein the first access groove is angled at about 45 degrees relative to the front surface.

4. The cable organizer of claim 1, further comprising a second access groove on the groove plate that is angled relative to the front surface of the groove plate.

5. The cable organizer of claim 4, wherein the second access groove is angled at about 30 degrees to about 60 degrees relative to the front surface.

6. The cable organizer of claim 4, wherein the second access groove is angled at about 45 degrees relative to the front surface.

7. The cable organizer of claim 1, wherein each tab has a first shape or a second shape, the first shape being rectangular and the second shape being a pointed shape.

8. The cable organizer of claim 7, wherein the first access groove has at least one linear portion and at least one curved portion, the at least one linear portion being at least partially defined by a tab having the first shape, and the at least one curved portion being at least partially defined by a tab having the second shape.

9. The cable organizer of claim 8, further comprising channels defined between the arms, the channels being configured to guide fiber optic cables from the first access groove to the plurality of fiber optic trays.

10. The cable organizer of claim 9, wherein the channels are orthogonal to the first access groove and are parallel to the fiber optic trays.

11. The cable organizer of claim 10, wherein the channels are connected to the linear portions of the first access groove.

12. A closure for housing fiber optic equipment in a telecommunications network, the closure comprising the cable organizer of claim 1.

13. A cable organizer for fiber optic cables, the cable organizer comprising:
    a support structure;
    a first groove plate mounted to the support structure;
    a first plurality of fiber optic trays pivotally mounted to a front surface of the first groove plate;
    an access groove on the first groove plate, the access groove on the first groove plate being angled relative to the front surface of the first groove plate and the access groove on the first groove plate providing access to the fiber optic cables from a side of the support structure;
    a first set of arms attached to the front surface of the first groove plate at a proximal end, each arm of the first set of arms being cantilevered with respect to the front surface of the first groove plate at a distal end, and each arm of the first set of arms having a tab on the distal end that at least partially defines the shape of the access groove on the first groove plate;
    a second groove plate mounted to the support structure;
    a second plurality of fiber optic trays pivotally mounted to a front surface of the second groove plate; and
    an access groove on the second groove plate, the access groove on the second groove plate being angled relative to the front surface of the second groove plate and the access groove on the second groove plate providing access to the fiber optic cables from the side of the support structure; and
    a second set of arms attached to the front surface of the second groove plate at a proximal end, each arm of the second set of arms being cantilevered with respect to the front surface of the second groove plate at a distal end, and each arm of the second set of arms having a tab on the distal end that at least partially defines the shape of the access groove on the second groove plate.

14. The cable organizer of claim 13, wherein the access groove on the first groove plate is angled at about 30 degrees to about 60 degrees relative to the front surface of the first groove plate.

15. The cable organizer of claim 14, wherein the access groove on the second groove plate is angled at about 30 degrees to about 60 degrees relative to the front surface of the second groove plate.

16. The cable organizer of claim 15, further comprising a second access groove on the first groove plate, the second access groove on the first groove plate being angled relative to the front surface of the first groove plate.

17. The cable organizer of claim 16, further comprising a second access groove on the second groove plate, the second access groove on the second groove plate being angled relative to the front surface of the first groove plate.

18. The cable organizer of claim 17, wherein the second access groove on the first groove plate is angled at about 30 degrees to about 60 degrees relative to the front surface of the first groove plate.

19. The cable organizer of claim 18, wherein the second access groove on the second groove plate is angled at about 30 degrees to about 60 degrees relative to the front surface of the second groove plate.

* * * * *